United States Patent
Parlow et al.

(10) Patent No.: US 10,900,752 B2
(45) Date of Patent: Jan. 26, 2021

(54) ARMOR PLATE AND ARMOR CONSISTING OF CARRIER AND ARMOR PLATE

(71) Applicant: KENNAMETAL INC., Latrobe, PA (US)

(72) Inventors: Werner Parlow, Mannweiler-Cölln (DE); Thomas Theuerkauf, Bayreuth (DE)

(73) Assignee: Kennametal Inc, Latrobe, PA (US)

( * ) Notice: Subject to any disclaimer, the term of this patent is extended or adjusted under 35 U.S.C. 154(b) by 0 days.

(21) Appl. No.: 16/631,724

(22) PCT Filed: Jul. 19, 2018

(86) PCT No.: PCT/IB2018/055380
§ 371 (c)(1),
(2) Date: Jan. 16, 2020

(87) PCT Pub. No.: WO2019/016750
PCT Pub. Date: Jan. 24, 2019

(65) Prior Publication Data
US 2020/0166314 A1    May 28, 2020

(30) Foreign Application Priority Data
Jul. 19, 2017   (DE) .................. 10 2017 116 319

(51) Int. Cl.
*F41H 5/04*  (2006.01)
*B32B 7/12*  (2006.01)
*B32B 15/04* (2006.01)
*B32B 15/18* (2006.01)

(52) U.S. Cl.
CPC ............... *F41H 5/045* (2013.01); *B32B 7/12* (2013.01); *B32B 15/043* (2013.01); *B32B 15/18* (2013.01); *F41H 5/0421* (2013.01); *B32B 2571/02* (2013.01)

(58) Field of Classification Search
CPC ...... F41H 5/045; F41H 5/0421; F41H 5/0457; F41H 5/0428; B32B 7/12; B32B 15/043; B32B 15/18; B32B 2571/02
USPC ...... 89/36.02; 501/98.2, 98.3, 98.1; 428/911
See application file for complete search history.

(56) References Cited

U.S. PATENT DOCUMENTS

| | | | | |
|---|---|---|---|---|
| 2,723,214 A * | 11/1955 | Meyer | .................. | F41H 5/0457 428/49 |
| 4,969,386 A * | 11/1990 | Sandstrom | ............ | F41H 5/0414 428/76 |
| 5,196,252 A * | 3/1993 | Harpell | .................... | B32B 3/14 428/102 |
| 5,648,042 A * | 7/1997 | Miller, Jr. | ............ | C04B 35/584 266/249 |

(Continued)

FOREIGN PATENT DOCUMENTS

| DE | 102017116319 | 1/2019 |
|---|---|---|
| WO | 2019016750 | 1/2019 |

OTHER PUBLICATIONS

International Search Report and Written Opinion corresponding to PCT/IB2018/055380, dated Nov. 28, 2018, 9 pages.

*Primary Examiner* — Michael D David
(74) *Attorney, Agent, or Firm* — Larry R. Meenan

(57) ABSTRACT

In one aspect, an armor plate (10) with a thickness of at least 2 mm and an edge length of at least 20 mm is described, wherein the armor plate (10) consists of a material that contains tungsten heavy metal or tungsten carbide as the essential component.

15 Claims, 1 Drawing Sheet

(56) References Cited

U.S. PATENT DOCUMENTS

Figure 1:
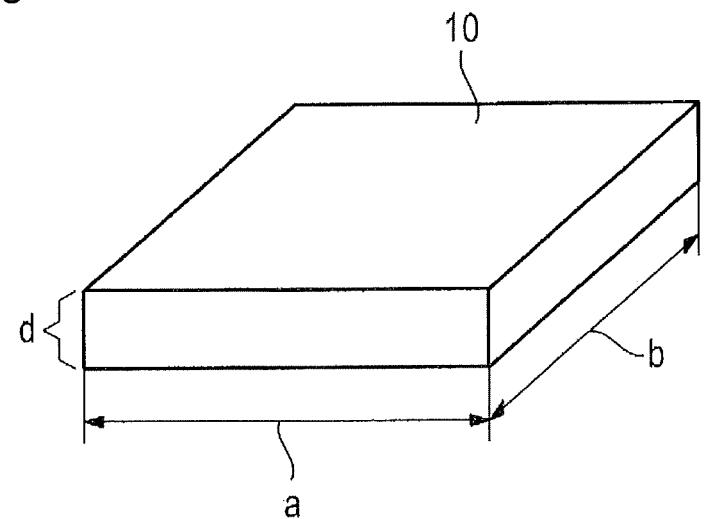

| | | | | |
|---|---|---|---|---|
| 5,686,689 A * | 11/1997 | Snedeker | ............... | F41H 5/023 |
| | | | | 89/36.02 |
| 5,866,839 A * | 2/1999 | Ohayon | ................... | F41H 5/02 |
| | | | | 89/36.02 |
| 6,135,006 A * | 10/2000 | Strasser | ............... | F41H 5/0435 |
| | | | | 2/2.5 |
| 6,203,908 B1 * | 3/2001 | Cohen | .................. | F41H 5/0414 |
| | | | | 428/397 |
| 6,389,594 B1 | 5/2002 | Yavin | | |
| 6,601,497 B2 * | 8/2003 | Ghiorse | ............... | F41H 5/0414 |
| | | | | 109/49.5 |
| 6,693,054 B1 * | 2/2004 | Yeckley | ............... | C04B 35/597 |
| | | | | 501/98.2 |
| 6,709,736 B2 * | 3/2004 | Gruber | ................ | C04B 35/573 |
| | | | | 428/293.4 |
| 6,805,034 B1 * | 10/2004 | McCormick | .......... | C04B 35/565 |
| | | | | 264/603 |
| 6,912,944 B2 * | 7/2005 | Lucuta | ................. | F41H 5/0414 |
| | | | | 89/36.01 |
| 7,077,048 B1 * | 7/2006 | Anderson, Jr. | .......... | F41H 5/04 |
| | | | | 2/2.5 |
| 7,077,306 B2 * | 7/2006 | Palicka | ................ | B23K 20/025 |
| | | | | 228/170 |
| 7,104,177 B1 * | 9/2006 | Aghajanian | .......... | F41H 5/0428 |
| | | | | 428/911 |
| 7,402,541 B2 * | 7/2008 | Cohen | .................. | C04B 35/119 |
| | | | | 501/97.2 |
| 7,478,579 B2 | 1/2009 | Carberry et al. | | |
| 7,562,612 B2 * | 7/2009 | Lucuta | .................. | F41H 5/0414 |
| | | | | 89/36.02 |
| 7,855,159 B1 | 12/2010 | Yeckley | | |
| 7,866,248 B2 * | 1/2011 | Moore, III | ........... | F41H 5/0421 |
| | | | | 89/36.02 |
| 8,281,700 B2 * | 10/2012 | Cohen | .................. | F41H 5/0492 |
| | | | | 89/36.02 |
| 8,318,622 B2 | 11/2012 | Yeckley | | |
| 8,367,576 B2 * | 2/2013 | Yeckley | .................... | B05B 1/00 |
| | | | | 501/98.3 |
| 9,040,160 B2 * | 5/2015 | Carberry | .......... | B32B 17/10733 |
| | | | | 428/410 |
| 9,228,805 B1 * | 1/2016 | Littlestone | ............. | B21D 13/00 |
| 9,650,701 B2 * | 5/2017 | Parsons | ................. | C22C 1/0491 |
| 10,234,243 B2 * | 3/2019 | Ganor | ....................... | B32B 3/12 |
| 2004/0033883 A1 * | 2/2004 | Yeckley | ................ | C04B 35/597 |
| | | | | 501/98.2 |
| 2004/0237763 A1 | 12/2004 | Bhatnagar et al. | | |
| 2005/0189683 A1 * | 9/2005 | Yeckley | ................ | C04B 35/597 |
| | | | | 264/659 |
| 2006/0137517 A1 * | 6/2006 | Palicka | ................. | F41H 5/0421 |
| | | | | 89/36.02 |
| 2006/0178256 A1 | 8/2006 | Yeckley | | |
| 2012/0177941 A1 | 7/2012 | Peterson et al. | | |
| 2012/0291621 A1 | 11/2012 | Sayre et al. | | |

\* cited by examiner

ARMOR PLATE AND ARMOR CONSISTING OF CARRIER AND ARMOR PLATE

This application is a U.S. National Phase of PCT/IB2018/055380, filed Jul. 19, 2018, which claims priority to German patent application no. 10 2017 116 319.0 filed Jul. 19, 2017, each of which is hereby incorporated by reference in its entirety.

The invention relates to an armor plate (so-called add-on armor) as well as an armor, which protects items, in particular vehicles, against the effects of being bombarded with projectiles, grenades or the like.

Various approaches to increase bombardment strength are known from the prior art. For example, known are additionally mounted armor plates consisting of ceramic. Also known are armor plates made of a composite material.

The object of the invention is to create an armor that has an acceptable weight, manufacturing costs as low as possible and a high safety class.

In order to achieve this object, an armor plate with a thickness of at least 2 mm and an edge length of at least 20 mm is provided, wherein the armor plate consists of a material that contains tungsten heavy metal or tungsten carbide as the essential component. The invention is based on the knowledge that it is possible with tungsten heavy metal or tungsten carbide to produce armor plates which have a very good protective effect at a still acceptable weight and can also be produced at acceptable costs.

Preferably, the armor plate has a thickness greater than 3 mm, preferably greater than 5 mm and particularly greater than 10 mm. In the case of a particularly high protective effect, larger thicknesses are also possible.

The dimensions of a single armor plate are preferably comparatively small. Edge lengths of greater than 40 mm have proven to be an optimal compromise between good manufacturability on the one hand and non-excessive effort when attaching the individual plates on the other hand. Preferably, the edge length is below 100 mm.

In one embodiment variant, the armor plates have a square shape with an edge length in the order of magnitude of 50 mm.

According to a preferred embodiment, the armor plate is a massive component that consists of tungsten heavy metal or tungsten carbide if unavoidable impurities are disregarded.

According to an alternative embodiment, the armor plate is a ceramic plate with a weight proportion of tungsten or tungsten carbide of up to 20%.

According to the invention, an armor with a carrier and several armor plates of the aforementioned type is provided for achieving the aforementioned object, wherein the armor plates are connected to the carrier by means of a permanently elastic adhesive layer. The adhesive layer serves as mechanical damping between the armor plates and the carrier, which increases the protective effect. At the same time, it is possible to exchange the individual armor plates separately, for example, if one of them is damaged after a bombardment.

The adhesive layer preferably has a thickness of at least 1 mm and preferably of at least 2 mm. A thicker adhesive layer increases the ability of the armor to absorb energy during a bombardment.

According to one embodiment, the adhesive layer has a wave-shaped profile when seen in a sectional view, wherein air is enclosed between adjacent wave crests. This increases the suspension capacity of the adhesive layer.

The air can be on the side of the armor plates. In other words, the adhesive layer is applied to the carrier, with the armor plates being applied to the adhesive layer thereafter.

The carrier preferably consists of a steel alloy so that the carrier itself is already providing a certain protective effect (protection class).

The housing is preferably a silicone-based adhesive. This adhesive is characterized by a good suspension capacity with high adhesion and at the same time good aging resistance while covering a high temperature range.

The invention is described below based on an embodiment which is shown in the enclosed drawings. They show:

FIG. 1 a perspective, schematic view of an armor plate; and

Figure 2:
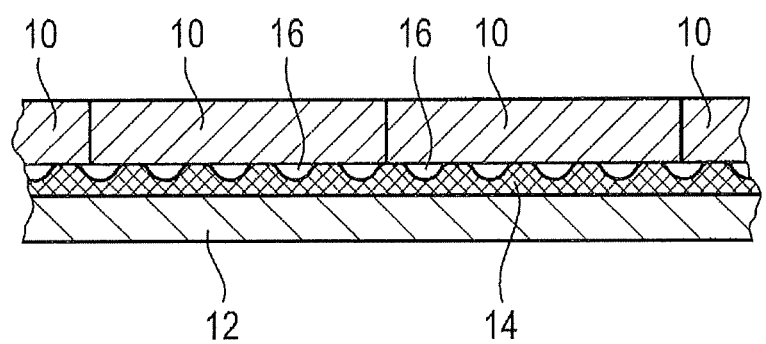

FIG. 2 a cross-section of an armor with a carrier onto which several armor plates are glued by means of an adhesive layer.

FIG. 1 schematically shows an armor plate 10 which is rectangular in the exemplary embodiment shown and has a constant thickness d.

The thickness d is several millimeters and depends on the desired protection class. For protection at the level STANAG 4, the thickness is in the order of magnitude of 5 to 10 mm.

In any case, the thickness of the armor plate 10 is selected in such a way that the plate as such is inherently stable.

The dimensions of the armor plate 10 are comparatively low. For rectangular plates, the edge lengths a, b are in the order of magnitude of at least 20 mm and preferably in the order of magnitude of 40 to 60 mm.

The armor plate 10 is a massive component made of tungsten heavy metal or tungsten carbide. The usual sintering methods, which are generally known for these materials, can be used for manufacturing.

In deviation from the rectangular shape, any shape which is suitable for completely covering (apart from the joints between adjacent armor plates) a subjacent surface area with several armor plates arranged next to each other may be used in principle. For example, the armor plates may also have the shape of an equilateral hexagon.

The joints between adjacent armor plates should be at least 0.55 mm and preferably at least 1 mm but preferably no more than 1.5 mm.

FIG. 2 shows the structure of an armor containing several of the armor plates 10 shown in FIG. 1.

The armor shown in FIG. 2 uses a carrier 12 onto which the armor plates 10 are glued adjacently to each other.

The carrier 12 consists of a steel alloy, in particular a high-strength steel alloy, as is used in the field of vehicle armor.

The armor plates 10 are glued onto the carrier 12 by means of an adhesive layer 14. The adhesive forming the adhesive layer 14 is a silicone-based adhesive.

In principle, it is conceivable to use an adhesive layer with a constant thickness. However, as seen in FIG. 2, the adhesive layer has a generally wave-shaped profile when viewed in a cross-section. As a result, the armor plates 10 are in contact only with the (flattened) wave crests of the adhesive layer 14. "Channels" 16 are formed between the individual wave crests and are each filled with air.

The special advantage of the armor shown in FIG. 2 is that the individual armor plates 10 can be exchanged separately, if necessary. The adhesive layer 14 ensures mechanical damping between the armor plates 10 and the underlying carrier, which increases the protective effect.

The invention claimed is:

1. Armor comprising a carrier, and several armor plates arranged laterally over the carrier, each armor plate comprising:
   a thickness of at least 2 mm and an edge length of at least 20 mm, wherein each the armor plate comprises a material that contains tungsten heavy metal or tungsten carbide as the essential component, the material forming an outermost surface of each armor plate,
   and a permanently elastic adhesive layer, by means of which the armor plates are connected to the carrier, such that joints are formed between edges of adjacent armor plates.

2. Armor plate according to claim 1, wherein the thickness is greater than 3 mm.

3. Armor plate according to claim 1, wherein the edge length is greater than 40 mm.

4. Armor plate according to claim 1, wherein it has a square shape with an edge length in the order of magnitude of 50 mm.

5. Armor plate according to claim 1, wherein it is a monolithic component consisting of tungsten heavy metal or tungsten carbide.

6. Armor plate according to claim 1, wherein it is a ceramic plate with a weight proportion of tungsten or tungsten carbide of up to 20%.

7. Armor according to claim 1, wherein the adhesive layer has a thickness of at least 1 mm.

8. Armor according to claim 1, wherein the adhesive layer has a wave-shaped profile when seen in a sectional view, wherein air is enclosed between adjacent wave crests.

9. Armor according to claim 8, wherein the air is on the side of the armor plates.

10. Armor according to claim 1, wherein the carrier consists of a steel alloy.

11. Armor according to claim 1, wherein the adhesive layer is formed by a silicone-based adhesive.

12. Armor according to claim 1, wherein the adhesive layer has a thickness of at least 2 mm.

13. Armor according to claim 1, wherein the joints between adjacent armor plates connected to the carrier have a thickness of at least 0.55 mm.

14. Armor according to claim 1, wherein the joints between adjacent armor plates connected to the carrier have a thickness of at least 0.55 mm to 1.5 mm.

15. Armor according to claim 1, wherein one or more of the armor plates are individually removable from the carrier.

* * * * *